Nov. 7, 1961      J. L. TILLERY      3,007,757
CAR TABLE
Filed March 10, 1960
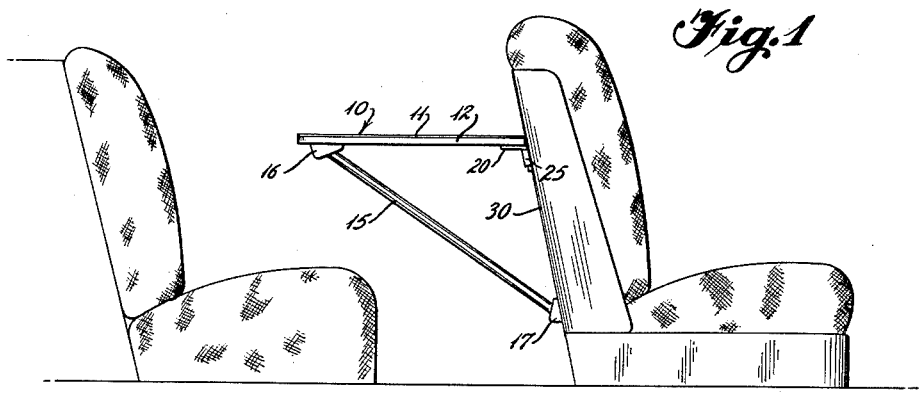
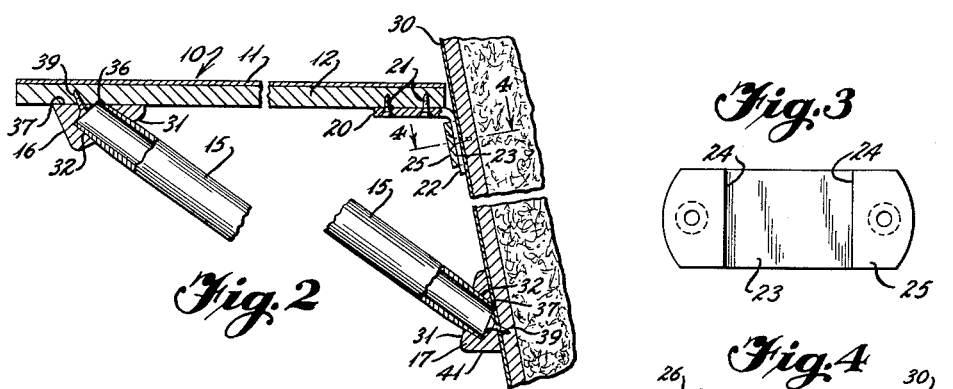
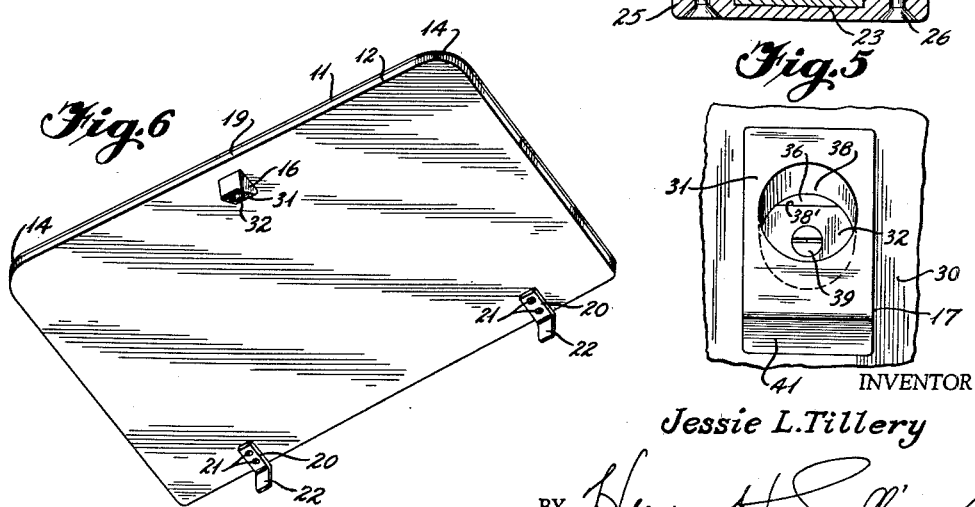
INVENTOR
Jessie L. Tillery
BY
ATTORNEY ns Patent Office 3,007,757
Patented Nov. 7, 1961

3,007,757
CAR TABLE
Jessie L. Tillery, 3412 Athol St., Baldwin Park, Calif.
Filed Mar. 10, 1960, Ser. No. 14,104
1 Claim. (Cl. 311—18)

This invention relates to automobile utility tables and has for its principal object the provision of a table of this type of maximum firmness with ease of assembly and removal.

A major object of the invention is to provide an automobile utility table of light weight material which will take up minimum space when not in use as for example in the trunk of the automobile and which can be assembled in a brief period of time and then be in a chosen position with the table sufficiently sturdy that it may be used with safety for any of the various purposes for which utility tables of this kind are generally employed.

A further object of the invention is to provide a utility table supported on the back of an automobile seat and having a sloping leg or legs fitting in sockets, one fast to the table near the proximate edge and the other fast to the back of an automobile seat near the bottom thereof, preferably with each sloping leg tubular and extending through a hole in each socket both into the bottom of the table top and into the back of the car seat with just enough contact to have the tube bite into the material at the bottom of the socket.

A still further object of the invention is to provide a utility table top supported at the rear by a sloping leg snugly fitting a pair of tapered sockets and being supported at the front by a bracket of strap metal having a reduced tongue fitting in a smooth groove in a keeper mounted at or near the top of the rear of a seat, the table top being anywhere from somewhat less than one-half the width of the car to the maximum length that can be accommodated in the trunk of the car, or in the case of a station wagon still wider, in this case preferably using three or more brackets and keepers and two or more sloping legs.

In the drawings:
FIG. 1 is a side elevation of my utility table installed between the front seat and the rear seat of an automobile.
FIG. 2 is a vertical section showing the front and rear fittings.
FIG. 3 is a bottom plan view of a keeper.
FIG. 4 is a horizontal section through a keeper applied to the back of a vehicle seat, with the tongue of the bracket in place.
FIG. 5 is an elevation of a bottom socketed holder.
FIG. 6 is a perspective looking up at the bottom of the table top.

While utility tables for use in automobiles, railway coaches, airplanes, etc., are well-known, many of these lack the desired sturdiness. The particular configuration of the various parts of this invention are such as to insure great firmness so that the table may be used in drive-in restaurants in place of the rather awkward and undersized window trays in common use. The table will vary in size from a one-person table to a full car-width table for use in a station wagon. When using three tables, one will be fast to the dash to the right of the steering wheel while the second and third tables are fast to the rear of the front seat and of the central seat, respectively, in this way accommodating at a meal a total of eight or nine people, which number could not possibly be accommodated with the usual drive-in facilities. Naturally the arrangement just described is excellent for picnics.

In describing the invention I will mention my preferred construction but it will be understood that the invention is not to be limited by the specific details recited unless required by the wording of the claims.

The table top bears the numeral 10 and preferably consists of a bottom sheet of Bakelite 11 faced with a thin top sheet 12 of formica or the like usually of a shade to harmonize with the color of the car furnishings. The table top is of generally rectangular form preferably having its two free corners rounded as at 14 while at the opposite side, the one against the car seat, the corners had best be right angular, the more snugly to fit the car seat or dash or other fixed portion of the car.

The leg 15 and the other fittings are preferably made of aluminum with a chromium finish although obviously the leg for example, could be made of a round rod of hardwood having its two ends slightly tapered. The leg 15, preferably a tube, fits snugly into an upper socketed holder 16 and a similar bottom holder 17, the former fast to the bottom of the table top, usually about the middle of the free edge 19 of the table top. These two leg holders are of a particular shape best shown in FIG. 2 in section and FIG. 5 in elevation and will be described later.

Referring now particularly to FIG. 2 the front of the table top 10 is secured to the back of the seat 30 by means of a bracket 20 secured as by the screws 21 to the table top and having a free end downwardly turned to form a tongue 22 which slides in a groove 23 with smooth walls 24 in a keeper 25 secured to the seat as by means of screws 26 one on either side of the tongue slot 23.

I prefer that the bracket be made of a flat strip of metal about one-eighth inch in thickness and with a milled-down tongue 22 as I prefer to keep the groove 23 a bit less than one-eighth inch deep as I find such a smaller thickness for the tongue is ample for strength and makes the device somewhat easier to assemble.

The upper socketed holder 16 may be exactly like the bottom leg holder as seen in FIG. 5 altho the top fastening 16 may be slightly less in forward-to-backward dimension as it has less strain. These fixtures each have a flat base 31 and a socket 32, the axis of which is disposed at an angle from 30° to 80° but generally between 35° and 40°, this angle of course varying with the type of car and the distance between the dash and the seat or between the front and back seats. The socket itself may be truly cylindrical altho I prefer to have the socket 32 very slightly tapered or conical so as to insure firm contact with the post which is usually made of aluminum alloy tubing and so can readily be slightly deformed by the taper of only one or two degrees, which is amply sufficient to give firm contact and yet allow the edge of the tube to penetrate through the opening 36 in the base 37 of the leg holder. As shown in FIG. 5 the hole 36 has an arcuate side 38, while the other side is formed by chord 38'. The provision of the hole 36 while not absolutely essential, is found in practice to be quite advantageous as in this way the tubular sloping leg actually indents both the bottom of the table top and the rear of the seat 30. I find that a single screw such as 39 is ample to hold either of the holders in place, particularly when the socket is deep enough to form the hole 36. The bottom leg holder for a three-fourth inch pipe leg need only be an inch wide by one and three-fourths inches overall. The outer or free face 31 makes a right angle with the deeper end 41, and the angle of slope can be as great as 70° so that with a seat back sloping at 20° the face 41 will be horizontal. The depth of the socket is about one-half inch on the deep side measuring from the free face 31.

In assembling the device the keepers 25 and the lower socket or sockets 17 are made fast to the rear 30 of the forward car seat and the bracket 20 and the upper socket 16 are made fast to the table top. With the parts thus assembled and the fittings are never removed in use, the sloping leg 15 is fitted very loosely into the lower socket 17, the top is next brought in position for the tongue 22 to be ready for insertion in the slot 23 in the keeper 25. When so placed, the upper end of the sloping rod 15 is in position to enter the socket 32 of the upper holder 16. A slight pressure on the table top now anchors the parts firmly together and as can readily be seen, the greater the pressure on the table top the more firm the engagement. In spite of the snugness of the various connections, a merely reasonable lifting on the bottom of the table top frees one end or the other of the leg 15 which can then readily be removed from the other fixture by a twisting motion. When the tongue 22 is slightly tapered as is preferred sometimes a slight upward knock on the bracket 20 will be used to loosen this connection. Of great advantage is the fact that the various fittings are always in place on the table top and it and the leg can be stored with substantially no loss in storage space.

What I claim is:

A quick detachable utility table for passenger automobiles comprising a generally rectangular table top of uniform thickness having proximate its long rear edge a socketed holder with a flat base engaging the bottom of the table top and having a free face at an acute angle to the flat base, said socket having a conical surface with a taper not exceeding two degrees and extending into the holder so as to penetrate the flat base to form an opening therein bounded by an arc and a chord, the bottom of the socket adjacent said opening having a hole, fastening means extending through said hole to secure the holder to the table top, a tubular angularly disposed leg snugly engaging said socket and extending through said opening to engage and indent the bottom of the table, a pair of brackets of strap metal strip stock each curved to form a flat portion secured to the bottom of the table proximate the long front edge of the table top and a flat, tapered down-turned tongue, a spaced pair of keepers secured to a fixed portion of the automobile at the level of the bottom of the table top each with a shallow groove having parallel walls to receive snugly the tongue of one of the brackets, and a second similar socketed holder secured to a fixed portion of the automobile, for frictionally holding the bottom end of said tubular leg, whereby the entire free surface of the top of the table is available for use and the leg and the table top may readily be removed by lifting the two tongues from their keepers, then twisting the leg to release it from the two holders, the two keepers and the lower socketed holder remaining secured to the automobile.

References Cited in the file of this patent
UNITED STATES PATENTS

| | | |
|---|---|---|
| 425,948 | Herbert | Apr. 15, 1890 |
| 687,371 | Dreisbach | Nov. 26, 1901 |
| 814,811 | Speed | Mar. 13, 1906 |
| 1,692,252 | Eichman | Nov. 20, 1928 |
| 2,093,861 | Bunevac | Sept. 21, 1937 |
| 2,544,504 | Keys | Mar. 6, 1951 |